US006886325B2

(12) United States Patent
Norris et al.

(10) Patent No.: US 6,886,325 B2
(45) Date of Patent: May 3, 2005

(54) PULSED COMBUSTION ENGINE

(75) Inventors: James W. Norris, Lebanon, CT (US);
Wendell V. Twelves, Jr., Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/722,158

(22) Filed: Nov. 24, 2003

(65) Prior Publication Data
US 2004/0123582 A1 Jul. 1, 2004

Related U.S. Application Data

(63) Continuation-in-part of application No. 10/608,238, filed on Jun. 27, 2003, which is a continuation-in-part of application No. 10/334,019, filed on Dec. 30, 2002.

(51) Int. Cl.$^7$ .............................. F02C 3/14; F02C 5/02
(52) U.S. Cl. .................. 60/39.34; 60/39.38; 60/226.1; 60/247; 60/39.76
(58) Field of Search ........................ 60/39.34, 39.35, 60/39.37, 39.38, 39.39, 226.1, 246, 247, 248, 39.76, 39.78, 201, 799; 431/1

(56) References Cited

U.S. PATENT DOCUMENTS

| | | | | |
|---|---|---|---|---|
| 2,395,403 A | * | 2/1946 | Goddard | 60/201 |
| 2,442,610 A | * | 6/1948 | Meister | 423/63 |
| 2,479,829 A | * | 8/1949 | Goddard | 60/201 |
| 2,543,864 A | * | 3/1951 | Melenric | 60/266 |
| 2,557,198 A | | 6/1951 | Nichols | |
| 2,579,049 A | * | 12/1951 | Price | 60/39.35 |
| 2,609,663 A | * | 9/1952 | Newcomb | 60/798 |
| 2,612,021 A | * | 9/1952 | Zuhn | 60/39.34 |
| 2,612,750 A | * | 10/1952 | Goddard | 60/201 |
| 2,630,676 A | * | 3/1953 | Seifert | 60/39.35 |
| 2,630,677 A | * | 3/1953 | Seifert | 60/39.35 |
| 2,680,949 A | * | 6/1954 | Butler | 60/39.34 |
| 2,736,369 A | * | 2/1956 | Hall | 431/158 |
| 2,748,564 A | | 6/1956 | Marchal et al. | |
| 2,836,958 A | * | 6/1958 | Ward, III | 60/39.35 |
| 2,888,803 A | | 6/1959 | Pon | |
| 2,930,196 A | | 3/1960 | Hertzberg et al. | |
| 3,321,911 A | * | 5/1967 | Myles | 60/39.35 |
| 3,362,157 A | * | 1/1968 | Taylor | 60/39.34 |
| 3,417,564 A | | 12/1968 | Call | |
| 3,469,396 A | * | 9/1969 | Onishi et al. | 60/39.35 |
| 3,557,551 A | * | 1/1971 | Campbell | 60/791 |
| 3,791,139 A | * | 2/1974 | Simons | 60/39.34 |
| 3,792,584 A | | 2/1974 | Klees | |
| 3,798,900 A | * | 3/1974 | Petersen | 60/786 |
| 4,314,444 A | | 2/1982 | Putnam et al. | |
| 4,570,438 A | | 2/1986 | Lorenz | |
| 5,138,831 A | * | 8/1992 | Cowan, Sr. | 60/39.34 |
| 5,218,816 A | | 6/1993 | Plemmons et al. | |
| 5,473,885 A | | 12/1995 | Hunter, Jr. et al. | |
| 5,579,633 A | | 12/1996 | Hunter, Jr. et al. | |
| 5,899,660 A | | 5/1999 | Dodd | |
| 5,937,635 A | | 8/1999 | Winfree et al. | |
| 5,960,625 A | * | 10/1999 | Zdvorak, Sr. | 60/39.34 |
| 2002/0139106 A1 | | 10/2002 | Meholic | |
| 2004/0123582 A1 | * | 7/2004 | Norris et al. | 60/39.38 |

FOREIGN PATENT DOCUMENTS

| | | |
|---|---|---|
| DE | 690569 | 4/1940 |
| DE | 19850812 | 8/2000 |
| GB | 710252 | 6/1954 |
| GB | 756288 | 9/1956 |

* cited by examiner

Primary Examiner—Cheryl J. Tyler
Assistant Examiner—William H. Rodriguez
(74) Attorney, Agent, or Firm—Bachman & LaPointe, P.C.

(57) ABSTRACT

A pulsed combustion device includes a support structure and a combustor carousel supported by the support structure and rotating relative thereto about an axis. The carousel has a number of combustion conduits in a circumferential array. Each conduit cyclically receives a charge and discharges combustion products of the charge. A venturi effect may help control fuel/air charge leakage from a flowpath spanning the carousel and a stationary manifold.

10 Claims, 10 Drawing Sheets

PULSED COMBUSTION ENGINE

This is a Continuation-in-Part of Ser. No. 10/608,238, filed Jun. 27, 2003, and entitled "PULSED COMBUSTION ENGINE" which is a Continuation-in-Part of Ser. No. 10/334,019, filed Dec. 30, 2002, and entitled "COMBUSTION IGNITION". Ser. Nos. 10/608,238 and 10/334,019 are incorporated herein by reference as if set forth at length.

BACKGROUND OF THE INVENTION (1) Field of the Invention

This invention relates to engines, and more particularly to hybrid pulse combustion turbine engines.

(2) Description of the Related Art

In a conventional gas turbine engine, combustion occurs in a continuous, near constant pressure (Rankine cycle), mode. Such conventional gas turbine engine combustion is relatively inefficient and has led to many efforts to improve efficiency.

It has been proposed to apply the more efficient combustion of near constant volume combustion pulse detonation engines (PDEs) to turbine engine combustors. In a generalized PDE, fuel and oxidizer (e.g., oxygen-containing gas such as air) are admitted to an elongate combustion chamber at an upstream inlet end, typically through an inlet valve as a mixture. Upon introduction of this charge, the valve is closed and an igniter is utilized to detonate the charge (either directly or through a deflagration to detonation transition). A detonation wave propagates toward the outlet at supersonic speed causing substantial combustion of the fuel/air mixture before the mixture can be substantially driven from the outlet. The result of the combustion is to rapidly elevate pressure within the chamber before substantial gas can escape inertially through the outlet. The effect of this inertial confinement is to produce near constant volume combustion.

U.S. Pat. No. 6,442,930, for example, suggests combustor use of PDE technology in addition to use as a thrust augmentor in engines with conventional combustors.

BRIEF SUMMARY OF THE INVENTION

One aspect of the invention involves a turbine engine having a case, a compressor section, and a turbine section. A combustor includes a fuel source and a circumferential array of combustion chamber conduits is downstream of the compressor and upstream of the turbine. The combustor further includes a manifold positioned to direct a mixture of air from the compressor and fuel from the fuel source to the array. The array is supported for continuous rotation relative to the case in a first direction about the case axis to cyclically bring each conduit from a charging zone for receiving a charge from upstream to a discharge zone for downstream discharging of products of combustion of the charge. The flowpath extends between a downstream portion of the manifold and an upstream portion of the array. The flowpath is locally bounded by first surface portions of the manifold and array. The first surface portions have at least a first relative radial alignment when the array is rotating at a first speed and a second radial alignment, closer than the first radial alignment, when the array is rotating at a second speed, greater than the first speed.

In various implementations, the engine may include at least one of a first seal inboard of the flowpath and a second seal outboard of the flowpath for sealing between the manifold and array. The seals may be annular frustoconical labyrinth seals. The seals may each have teeth on the array and a mating rub strip on the manifold. The rub strip may be abradable relative to a remaining portion of the manifold. The teeth and rub strip may be in closer proximity when the array is rotating at the second speed than at the first speed. The first surfaces of the manifold and array each may include an inboard portion and an outboard portion at least over a streamwise span convergent toward a junction between the manifold and array.

There may be a first airflow substantially through the compressor and turbine and a first portion of the first airflow may pass through the combustion chamber conduits in the charges and a second portion of the first airflow may bypass combustion. A mass flow ratio of the first portion to the second portion may be between 1:1 and 1:3. The engine may be a turbofan and the first airflow may be a core airflow. A bypass airflow may bypass the compressor and turbine. A mass flow ratio of the bypass airflow to the core airflow may be between 3:1 and 9:1. The combustion may comprise detonation. The turbine and compressor may each comprise high and low stages on respective high and low spools. The array may be on a free spool and its rotation may be driven by partially tangential direction of the products of combustion. The conduits may be at least partially tangentially directed. The conduits may be substantially longitudinally directed and the engine may include a number of airfoils mounted on the free spool to partially tangentially direct the products. The engine may include a number of igniters, each of which is positioned relative to an associated one of the conduits to ignite the combustion of the charge in the associated conduit. The engine may include means for starting the rotation.

Another aspect of the invention involves a turbofan engine having a fan, a compressor, and a turbine coaxial with the compressor along an axis. A pulsed combustion combustor receives air from the compressor and outputs combustion gases to the turbine. The combustor has a number of combustion chamber conduits held for rotation about the axis through a number of positions. The positions may include at least one charge receiving position for receiving a charge from upstream, at least one initiation position for initiating combustion of the charge, and at least one discharge position for downstream discharging of products of combustion of the charge. Means direct the charge to the conduits in the at least one charge receiving position. The means include a first portion and a second portion, downstream of the first portion and positioned to rotate with the conduits during the rotation. At least one of the first and second portions includes means for controlling leakage of the charge through one or more gaps between the first and second portions via a venturi effect.

In various implementations, the means for controlling may include inboard and outboard surfaces of both the means for directing and a leading annular element joining the combustion chamber conduits convergent toward a junction between the means for directing and the leading annular element. The engine may include at least one fuel injector for injecting fuel into air from the compressor to form the charges. The engine may include at least one ring of foils rotating with the conduits as a unit.

Another aspect of the invention involves a pulsed combustion device including a support structure and a combustor carousel supported by the support structure and rotating relative thereto about an axis. The carousel includes a number of combustion conduits in a circumferential array, each cyclically receiving a charge and discharging combustion products of the charge. The carousel includes a non-rotating manifold portion having at least a first sector conveying air to an aligned transient first group of the combustion conduits and at least a second sector blocking upstream ends of an aligned transient second group of a combustion conduit from upstream communication. First surface portions of the array and manifold provide a venturi effect at a junction between the array and manifold to limit leakage of the charge through the junction.

In various implementations, the carousel may include means for driving the rotation. The means may include a number of foils positioned to redirect the discharge from the combustion conduits. The combustion may include detonation. The device may be a turbine engine having a compressor upstream of the carousel and a turbine downstream of the carousel. There may be at least ten such conduits. The conduits may have exemplary median cross-sectional areas between 2 in$^2$ (13 cm$^2$) and 8 in$^2$ (52 cm$^2$). The device may be used in aircraft propulsion.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 7 is a transverse sectional view of a core duct of the engine of FIG. 1 taken along line 7—7.

FIG. 9 is a transverse sectional view of the core duct of the engine of FIG. 1 taken along line 9—9.

Like reference numbers and designations in the various drawings indicate like elements.

DETAILED DESCRIPTION

In lieu of conventional Rankine cycle combustion, one or more pulse combustion devices may be located in one or more rings about the engine. The ring(s) are located on a rotating carousel, rotation of which passes each device through a first portion of a rotation during which the device is charged and to a second portion in which it is discharged, with combustion occurring between. In a given 360° of rotation there may be more than one pair of charging and discharging phases. The rotation may be driven by one of the turbine's spools or by tangential diversion of gases discharged by the devices.

Figure 1:
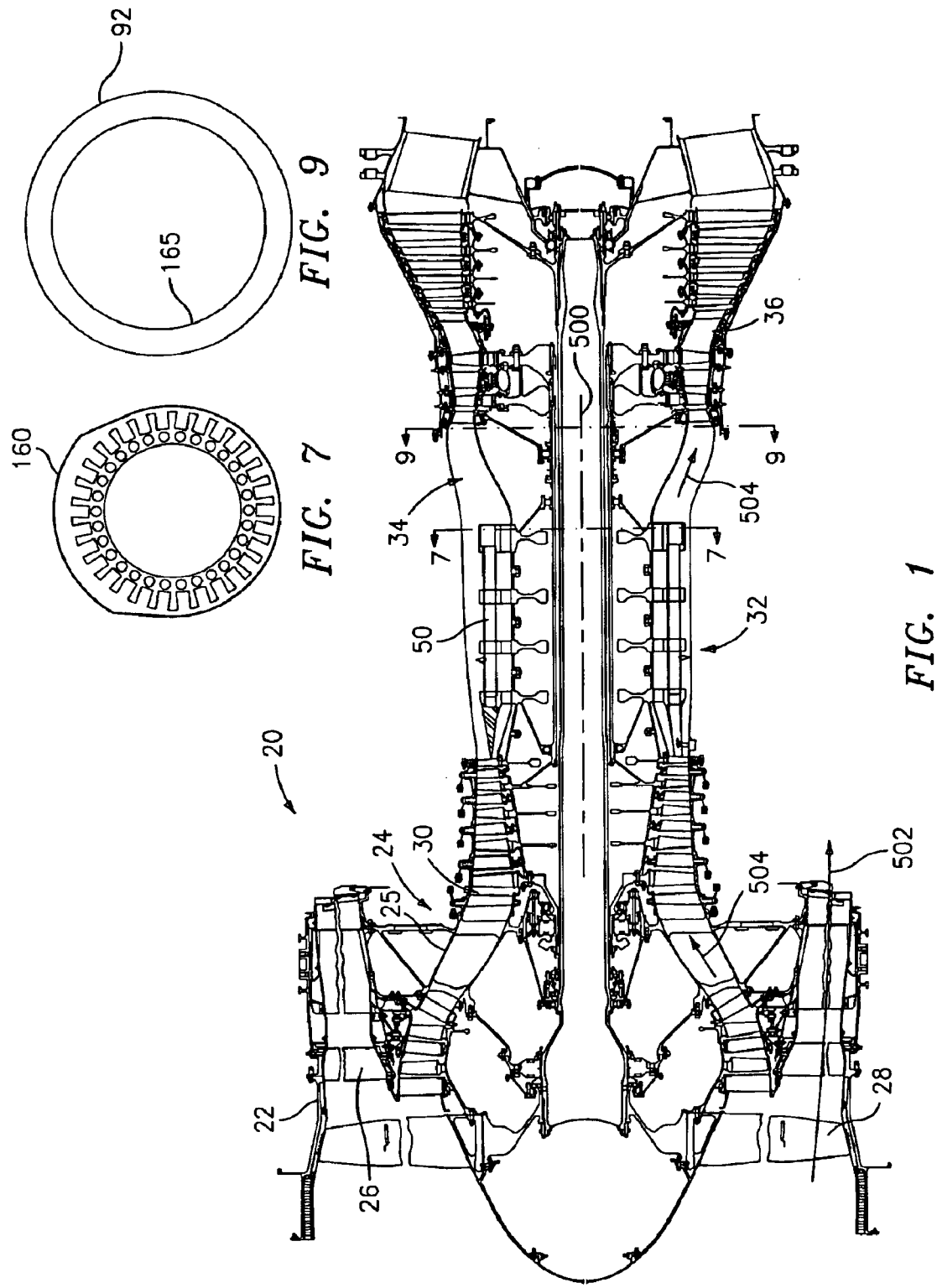
FIG. 1 is a partial longitudinal sectional view of a turbofan engine.

FIG. 1 shows a turbofan engine 20 having central longitudinal axis 500, a duct 22 and a core 24. The duct is supported relative to a case assembly 25 of the core by vanes 26. Of inlet air entering the duct, a fan 28 drives a bypass portion along a first flow path 502 radially between the duct and the core and core portion along a second flowpath 504 through the core. In the core downstream of the fan, a compressor section 30 having alternating rings of rotor blades and stator vanes compresses the core air and delivers it further downstream to a combustor section 32 where it is mixed with fuel and combusted. A combustor bypass portion of the core air may bypass the combustor and be mixed in a mixing duct 34 downstream of the combustor with the portion flowing through the combustor. Downstream of the mixing duct, a turbine section 36 is driven by the mixing duct output to, in turn, drive the compressor and fan. An augmentor (not shown) may be located downstream of the turbine.

Figure 2:
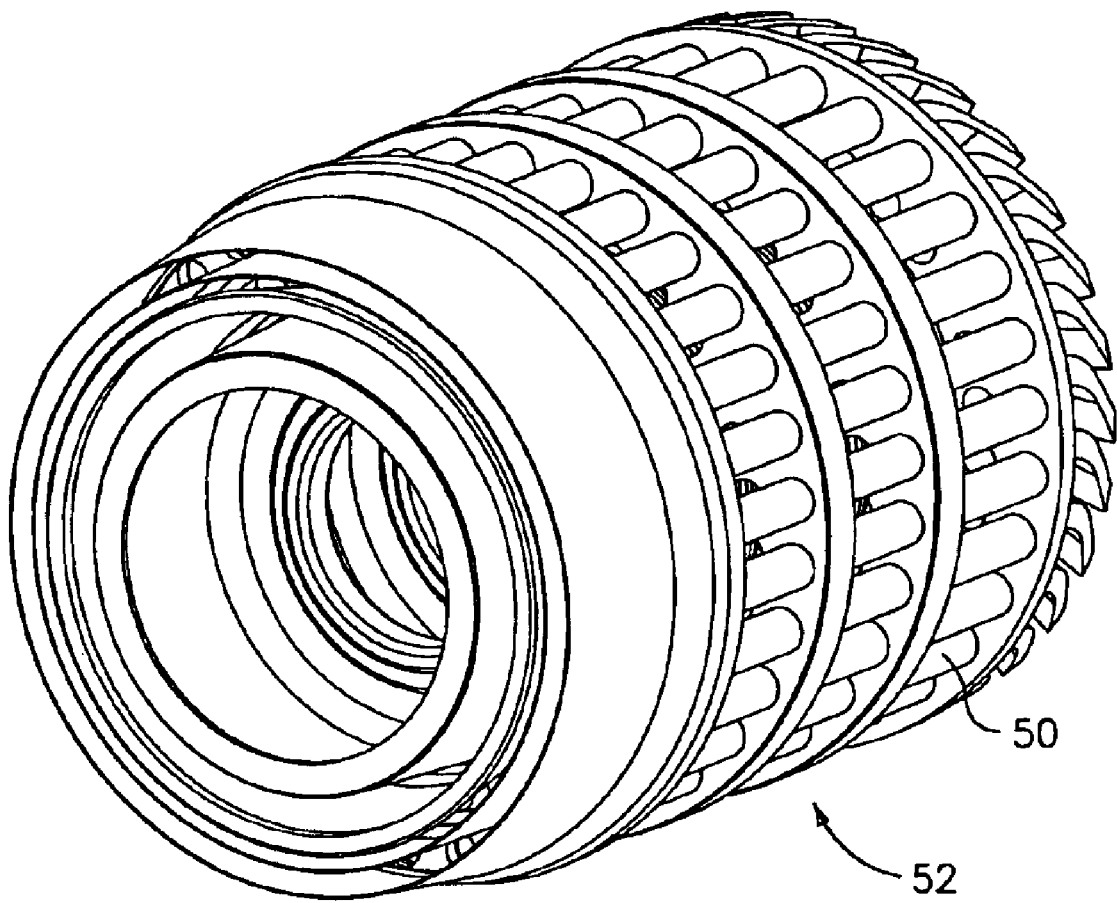
FIG. 2 is an isolated isometric view of a combustor of the engine of FIG. 1.
Figure 3:
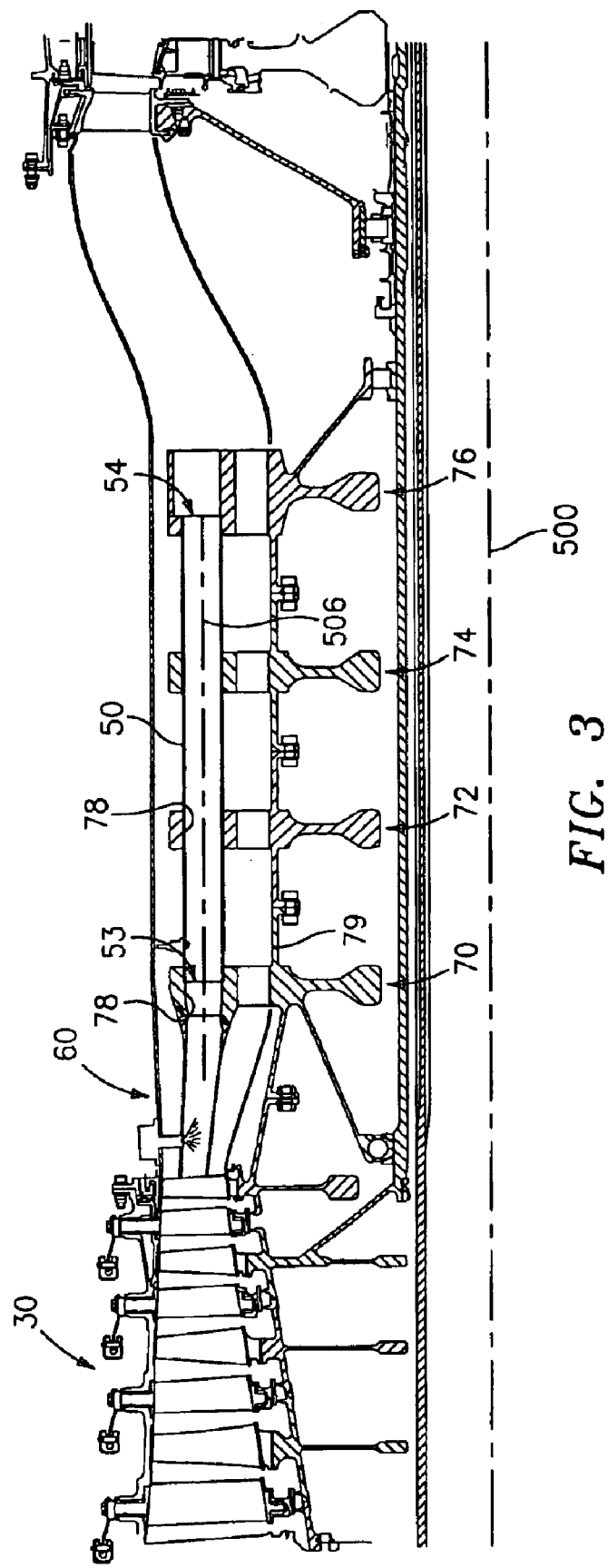
FIG. 3 is a partial longitudinal sectional view of the engine of FIG. 1 along a charging sector.
Figure 4:
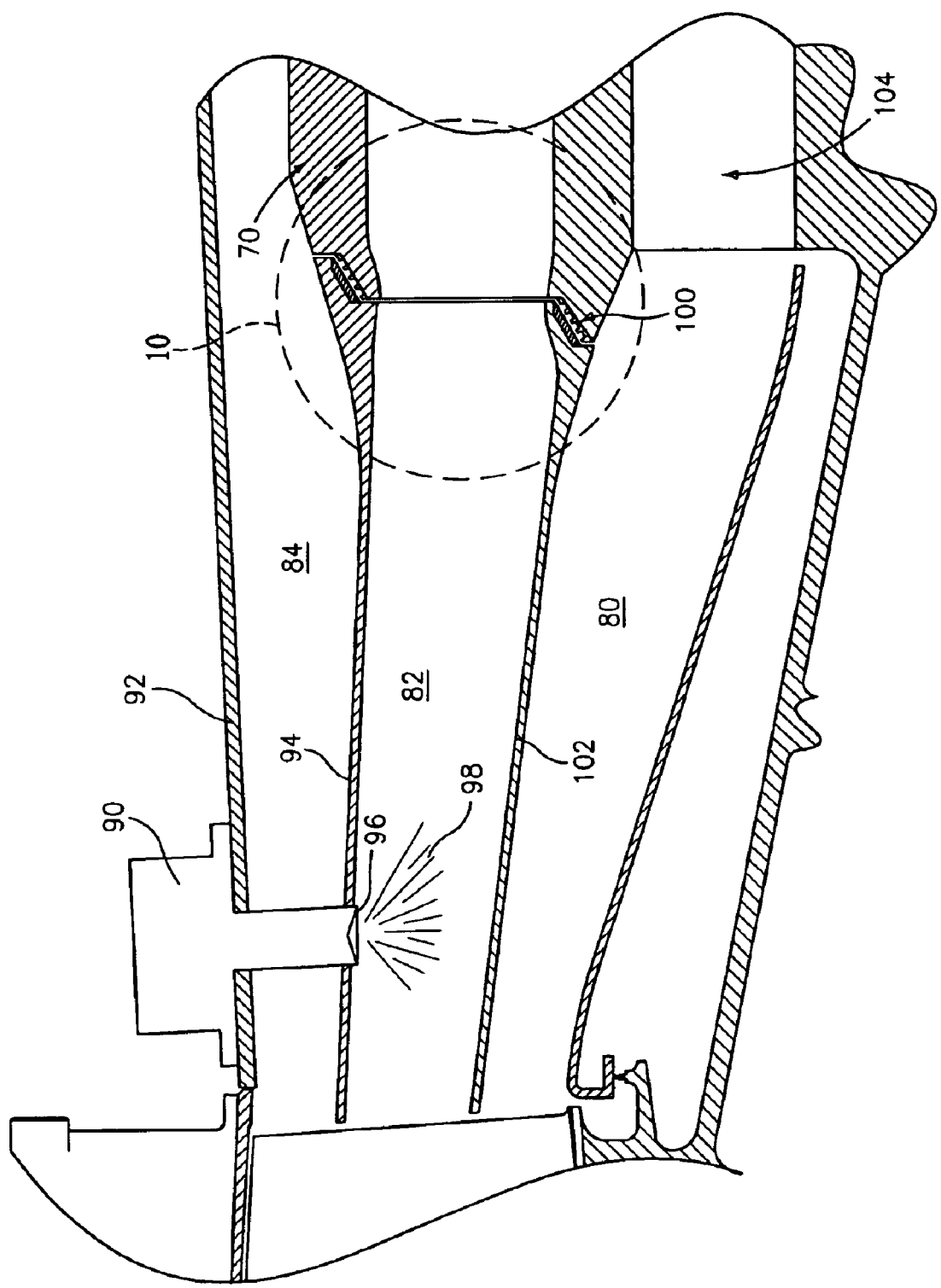
FIG. 4 is a longitudinal sectional view of a manifold of the engine of FIG. 1 along the charging sector.

The exemplary combustor includes a ring of combustion tubes 50 which may be operated as pulse combustion tubes. Exemplary tubes are operated as pulse detonation tubes, although a similar structure may potentially be used with pulse deflagration tubes. The tubes are mounted in a carousel structure 52 (FIG. 2) for rotation relative to the case assembly about the engine central longitudinal axis. Each exemplary tube 50 (FIG. 3) has a forward upstream inlet end 53 and an aft downstream outlet end 54 along a central longitudinal axis 506. The tube inlet ends are proximate an aft, downstream portion of a fixed manifold 60. The exemplary carousel includes a number of disks 70, 72, 74, and 76 from fore to aft. In the illustrated embodiment and as discussed further below, the carousel forms a third free spool in addition to the high and low spools of the turbine/compressor combination. Proximate their outboard peripheries, the disks have apertures 78 into which the tubes 50 are secured. Disk platforms 79 combine to form a cylindrical inboard wall of the local core flow path. In the exemplary embodiment, along a charging sector of the manifold, the manifold 60 splits the core flow into three portions in inboard, intermediate, and outboard manifold sections 80, 82 and 84 (FIG. 4). Along this charging sector, the manifold has a circumferential array of fuel injectors 90 mounted in an outer wall 92 of the core and penetrating the outer section 84 to a wall 94 separating the sections 82 and 84. An injector outlet 96 is positioned to introduce fuel 98 into the intermediate section 82 where it mixes with that portion of the core air passing through the intermediate section. Along the charging sector, the manifold intermediate section 82 is in communication with a transiently aligned group of the tubes 50. A sealing system 100 is provided on a downstream end of the wall 94 and a downstream end of a wall 102 separating the sections 80 and 88. The sealing system cooperates with the leading disk 70 to pass the fuel air mixture from the manifold section 82 into the tubes 50 when the tubes are aligned with the charging sector. In the illustrated embodiment, the inboard manifold section 80 passes an inboard portion of the core air to the carousel where it may pass through inboard apertures 104 in the disks to bypass the tubes 50. Similarly, the manifold outboard section 84 passes an outboard portion of the core air around the outer peripheries of the disks to bypass the tubes. Once in the carousel, there may be mixing of these two bypass portions between the disks.

Figure 5:
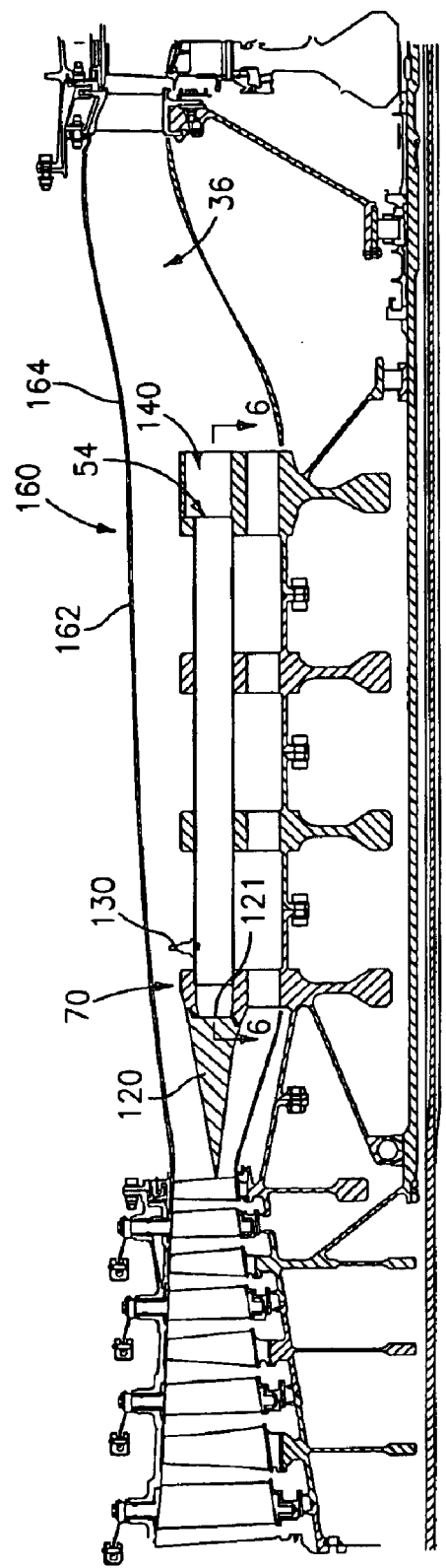
FIG. 5 is a partial longitudinal sectional view of the engine of FIG. 1 along a discharging sector.

Outside of the charging sector, the manifold has a blocking element 120 (FIG. 5) which cooperates with the leading disk 70 to seal the inlet end of the tube 50 to create a combustion chamber. The exemplary blocking element 120 may be formed by a merging and thickening of the walls 94 and 102. The exemplary combustion chamber is bounded by a vessel created by the tube 50, a small portion of the disk 70 thereahead and an aft blocking surface portion 121 of the element 120. Ignition and discharge may occur when each tube is so sealed. Along this ignition/discharging sector, the exemplary manifold separates the core air flow into inboard and outboard flows bypassing the tubes in similar fashion to the bypassing flows of the charging sector. The engine includes means for initiating the combustion of the fuel/air charge in the combustion chambers. Exemplary means initiate this as soon as the combustion chamber is closed off at the beginning of the ignition/discharging sector. FIG. 5 shows means in the form of a single spark plug 130 for each tube 50. When a single such plug is used, it is advantageously located proximate the upstream end of the combustion chamber. In the exemplary embodiment, the plug is mounted in the sidewall of the tube 50 just downstream of the disk 70. This exemplary spark plug rotates with the tube and is powered/controlled by an appropriate distributor mechanism or the like providing electrical communication between rotating and non-rotating portions of the engine. An alternative embodiment would mount the plug 130 in the blocking member 120 with its operative end in an opening in the surface 121. Such a mounting may reduce complexity of electrical communication between rotating and non-rotating parts of the engine. Yet alternate initiation systems include multi-point, continuous (e.g., laser or other energy beam), or multi-continuous systems. Examples of such systems are found in Ser. No. 10/334,019. The combustion chamber has an overall length L and a characteristic transverse dimension identified as a diameter D. When triggered, the igniter produces a detonation pulse which propagates a flame front radially outward from an associated ignition point at the plug at a supersonic speed (e.g., over about 3,000 feet per second (fps) and typically in the range of 4,000–6,000 fps). Near total combustion will be achieved in the time required for the flame front to travel from the plug to the outlet 54. With the plug proximate the upstream end of the chamber and D substantially smaller than L, this travel distance is essentially equal to L. An exemplary operating pressure ratio (OPR) for such detonation combustion is between 2:1 and 6:1.

Figure 6:
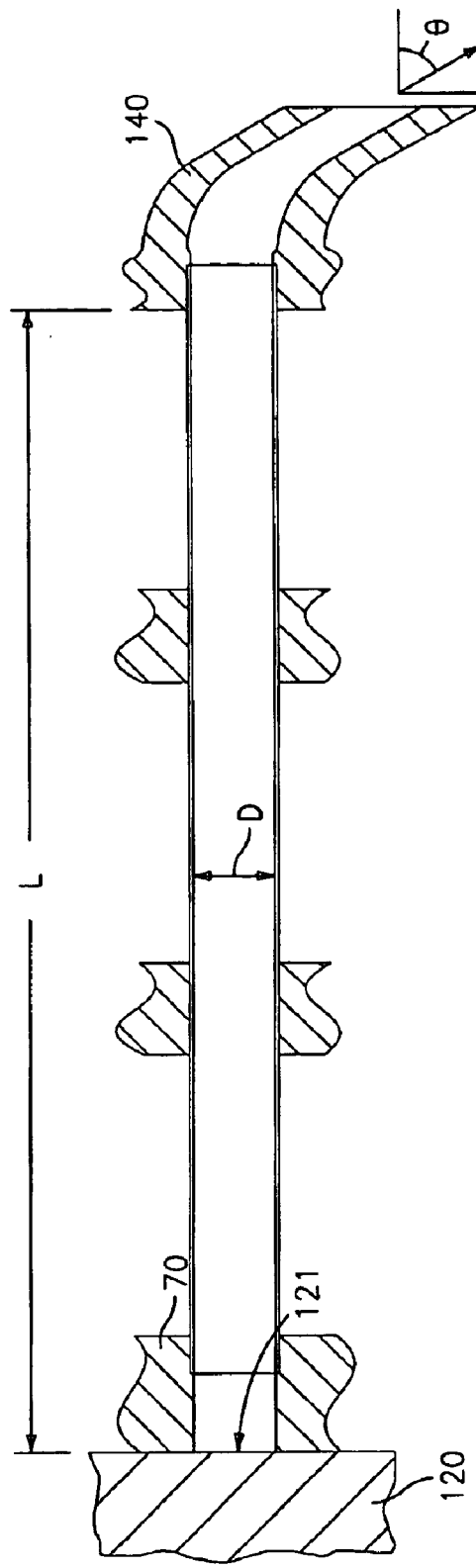
FIG. 6 is a sectional view of a combustion tube of the engine of FIG. 5 taken along line 6—6.

Combustion gases discharged from the tube outlets 54 encounter turning vanes 140 which may be unitarily formed with the aft carousel disk 76. In the exemplary embodiment, an equal number of turning vanes 140 are alternatingly interspersed with the tubes 50. Adjacent vanes divert the discharge from the tubes by an angle θ (FIG. 6) relative to the tube axis 506 and local longitudinal centerplane of the engine. In the exemplary embodiment, this diversion applies sufficient torque to the carousel to rotate the carousel at a desired rotational speed. In an exemplary three-spool engine, an exemplary steady state rotational speed of the carousel is 2,000–18,000 RPM. The specific operating range will be influenced by engine dimensional considerations in view of carousel structural integrity and the number of charge/discharge cycles per rotation. A narrower range of 6,000–12,000 target RPM may be appropriate, with the lower third of this range more likely for a two cycle/rotation engine and the upper third for a one cycle/rotation engine. In operation, these speeds may be substantially lower than the high spool speed and approximately the same or moderately lower than the low spool speed. An initial rotation may be provided by the engine starter motor or by a dedicated starter motor for the combustor.

The discharge flow is mixed with the combustor bypass flows before encountering the turbine. In the exemplary embodiment, an outboard portion of the flow passing over the trailing disk 76 may at least partially mix with a discharge flow along the vanes 140. An inboard portion passing through the apertures 104 in the trailing disk may mix further downstream in the mixing duct 34.

Figure 8:
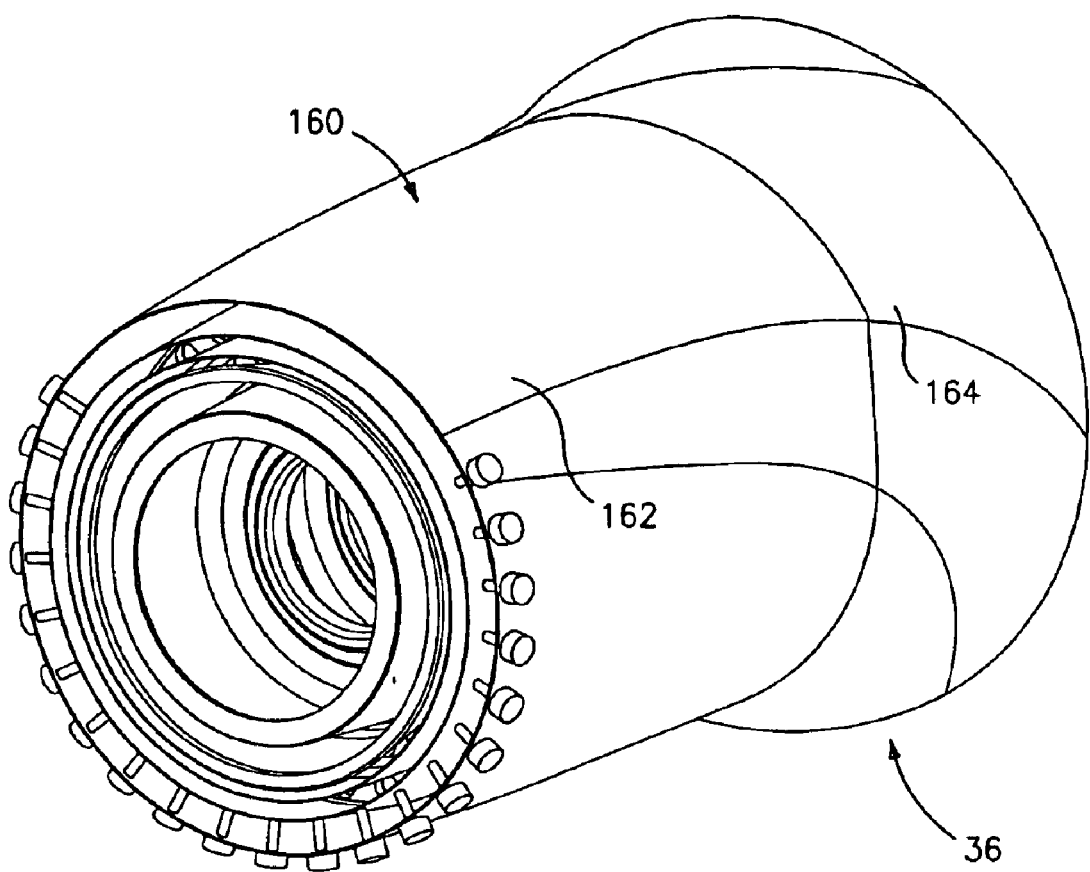
FIG. 8 is an isolated isometric view of the duct of FIG. 7.

The features of the mixing duct may advantageously be synergistically designed relative to features of the core outer wall 92 along the combustor. The core outer wall 92 has a locally radially elevated section or hump 160 (FIGS. 5 and 7) with a first portion 62 extending aft from near a forward end of the carousel and a second portion 164 extending further rearward along a forward portion of the mixing duct 34 (FIGS. 5 and 8). Portions of the outer wall fore and aft (e.g., FIG. 9) of the hump are of more even radial position about the circumference of the core. The hump is associated with the discharging sector. The hump is shaped to drive a large percentage of the core bypass flow volume to the vicinity of the firing combustor tubes. The hump provides a non-uniform cross section for increased cross sectional flow area in the firing discharge zone of a mixing plane. The large volume of relatively cool core air that bypasses the combustor tube mixes with and reduces the temperature of the exhaust effluents. Along the portion 164, the cross-section of the mixing duct transitions to an annular cross-section prior to reaching the turbine face. The exemplary core inboard wall 165 (FIG. 9) is annular along substantially the entire length of the mixing duct and forms a smooth transition from the portion provided by the disk platforms 79 thereahead. The transition geometry forces mixing of core bypass and exhaust gas to provide a uniform distribution of the mixed gases around the circumference of the mixing duct at the turbine face.

The hump and mixing duct geometry and the volume between the turning vanes and the turbine face serve three primary functions: 1) to diffuse the high velocity exhaust gases from the combustor tubes to a useable pressure rise compatible with the engine through flow requirements; 2) to mix out and transition localized hot, exhaust effluents and cool core by-pass air to a uniform (or nearly uniform) temperature flow of gas at the turbine face; and 3) act as a pressure pulse dampener to smooth out the flow presented to the turbine. An exemplary hump may be disposed helically in accordance with the helical velocity component of exhaust gases exiting the combustor (e.g., as in FIG. 8).

In exemplary embodiments, there may be between four and sixty combustion tubes, more narrowly, twenty and forty. Exemplary tube lengths (and the approximately similar combustion chamber lengths) are between six inches (15 cm) and forty inches (102 cm), more narrowly, twelve inches (30 cm) and thirty inches (76 cm). The exemplary tube cross sectional areas are between 1.0 inch$^2$ (6.5 cm$^2$) and twenty inch$^2$ (129 cm$^2$), more narrowly, 2.0 inch$^2$ (12.9 cm$^2$) and eight inch$^2$ (51.6 cm$^2$). An exemplary discharging sector is between 5° and 120°, more narrowly, 10° and 100°. However, the key limitation regarding the charging sector is the time required to charge the combustion tubes at a given radius from the engine centerline and rotational speed. This gives rise to the possibility of multiple charge/discharge cycles during one 360° rotation of the carousel. In such a situation there could be multiple charging and discharging sectors, humps, and the like.

The magnitude of the pressure pulses from the individual combustion tubes is minimized by the apparent high firing frequency (e.g., 1000 Hz to 6000 Hz) provided by the rotating tube pack. The pressure pulses may overlap at a relatively uniform peak level resulting in a quasi-steady state effluent pressure. Additional viscous dampening of any residual small cyclical pressure variations occurs in the volume of the duct as the core bypass and combustor tube exhaust gases mix together. The mixed gases are then expanded through the turbine.

Figure 10:
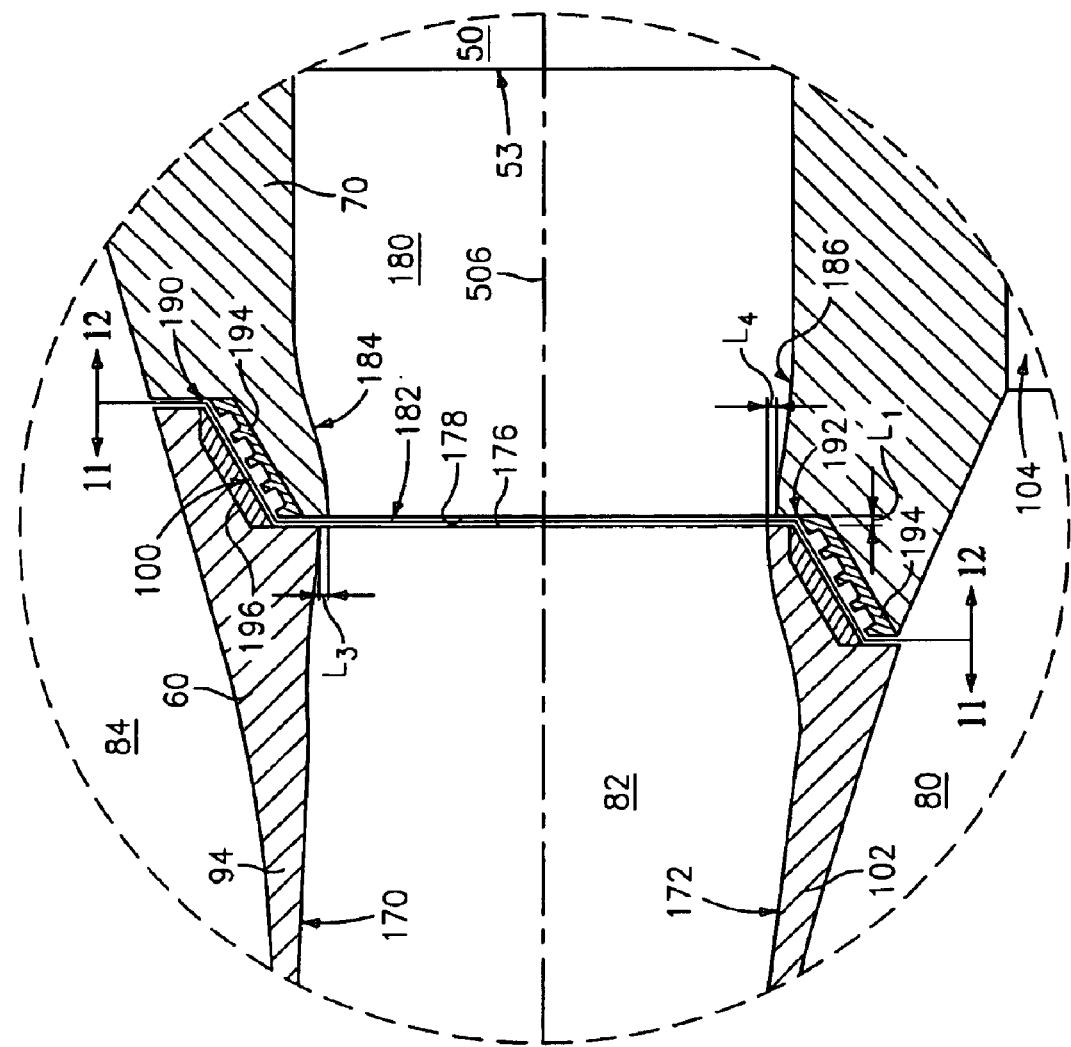
FIG. 10 is an enlarged view of a manifold-disk junction of the engine of FIG. 4.
Figure 11:
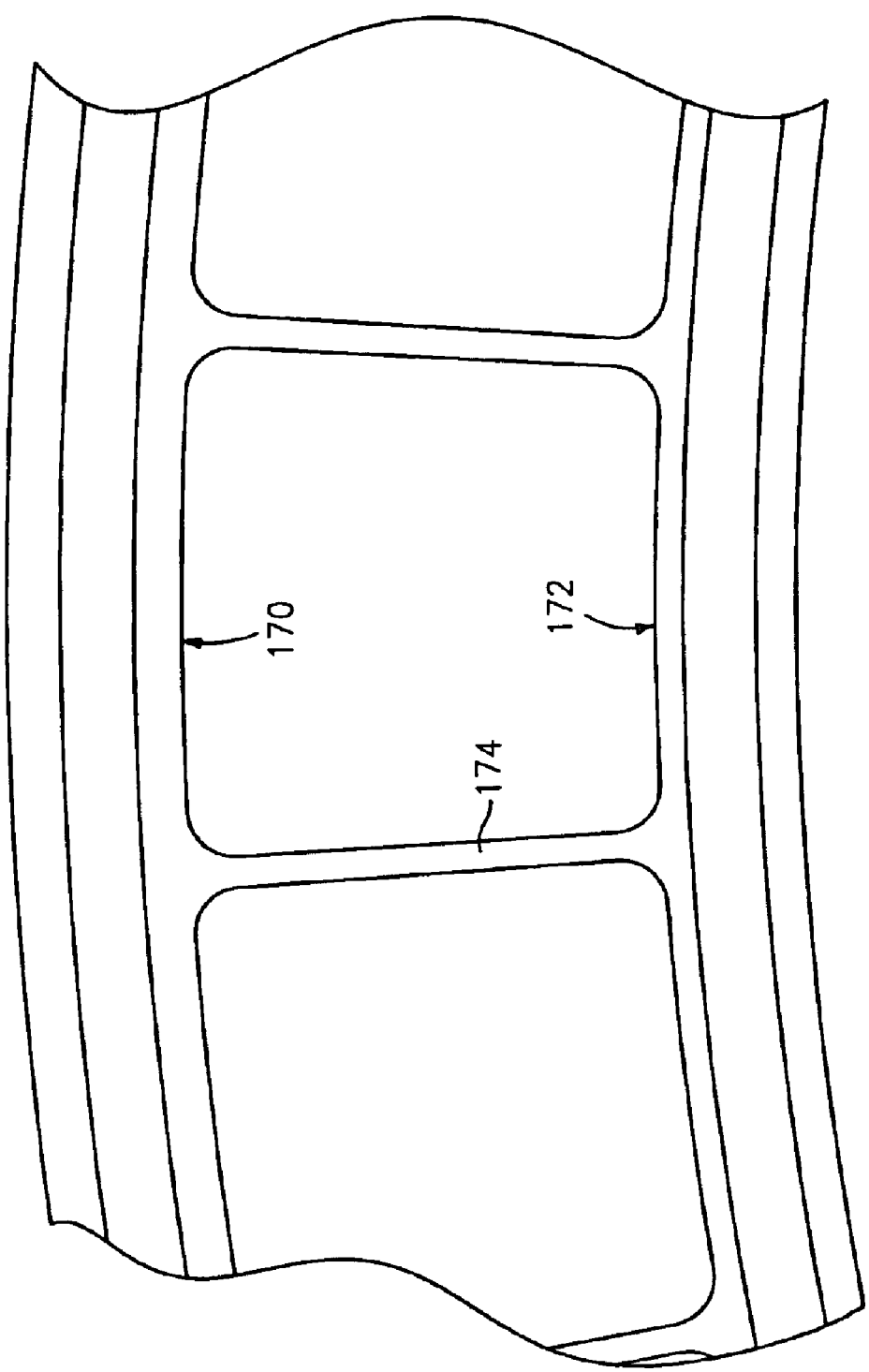
FIG. 11 is a partial downstream end view of the manifold taken along line 11—11 of FIG. 10.

FIG. 10 shows the junction of the manifold 60 and leading carousel disk 70. Within the manifold, the manifold-to-carousel flowpath is bounded at a (radially) outboard extreme by an inboard surface 170 of the wall 94. Inboard, it is bounded by the outboard surface 172 of the wall 102. In the exemplary embodiment, along the charging sector the surfaces 170 and 172 are joined by a regular circumferential array of longitudinally and radially extending webs 174 (FIG. 11) creating discrete divisions of the intermediate section 82. Returning to FIG. 10, the surfaces 170 and 172 converge along a streamwise region upstream/ahead of a downstream manifold outlet 176 at the junction. The exemplary outlet 176 is separated from an inlet 178 to a flow passageway 180 ahead of the inlet end 53 of a tube 50. In the exemplary embodiment, the outlet 176 and inlet 178 are separated by a gap 182 having a static longitudinal span $L_1$.

Figure 12:
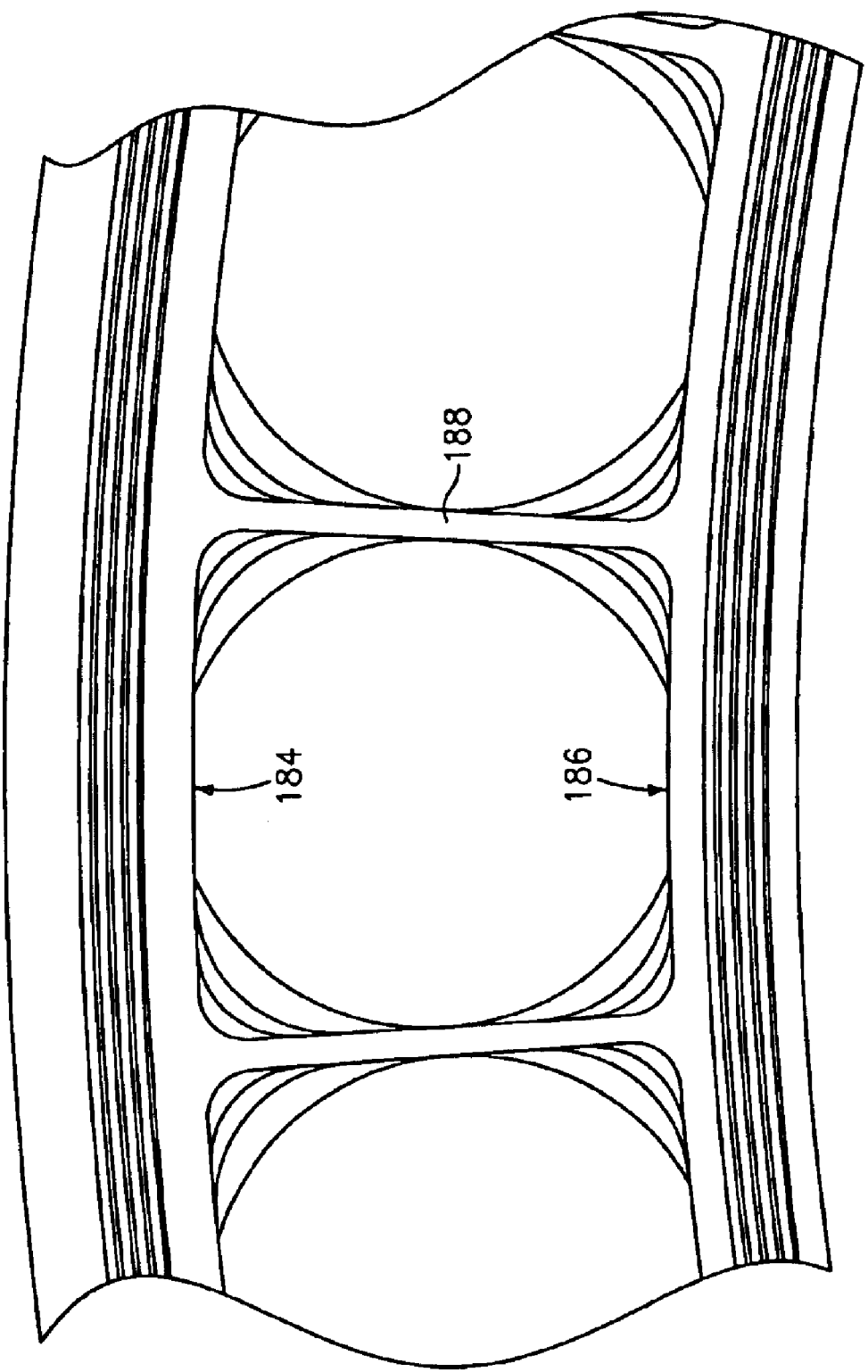
FIG. 12 is a partial upstream end view of the disk taken along line 12—12 of FIG. 10.

In the exemplary embodiment, outboard and inboard surfaces of the passageway 180 are shown as 184 and 186. FIG. 12 shows these surfaces as separated by a circumferential array of longitudinally and radially extending webs 188. Near the inlet 178, the surfaces 184 and 186 are largely circumferential, however downstream thereof they gradually transition to form a surface of circular section to provide a smooth transition to the circular section of the associated tube 50. Returning to FIG. 10, near the inlet 178 the surfaces 184 and 186 are streamwise convergent toward the inlet and associated junction with the manifold. FIG. 10 further shows the sealing system as including an outboard seal 190 and an inboard seal 192. The outboard and inboard seals each are formed as exemplary labyrinth seals with replaceable teeth 194 carried by the disk 70 and a complementary abradable strip 196 carried by the manifold. The exemplary seals 190 and 192 extend at an angle off longitudinal (e.g., about an exemplary 25°–40°), with the teeth facing outboard and forward and the associated face of the associated rub strip facing inboard and aft. In the static condition, at the junction, the surfaces 170 and 184 are radially offset by a distance $L_3$, with the surface 184 inboard. The surfaces 172 and 186 are offset by a radial distance $L_4$, with the surface 186 also inboard. Exemplary $L_3$ and $L_4$ are the same. As the carousel is initially spun up rotating at low speed and before heating up, these offsets may not substantially change. However, at a higher operating speed, the disk 70 is subject to radial strain due to centrifugal action associated with the rotation and may be subject to greater thermal expansion than the manifold. Either or both of these factors may increase the radial positions of the surfaces 184 and 186, tending to bring them into alignment with the surfaces 170 and 172 (i.e., reducing or eliminating the offsets relative to $L_3$ and $L_4$). Radial spacing similar to $L_3$ and $L_4$ may respectively be provided between the teeth and rub strips of the seals 190 and 192. Exemplary material for the teeth 194 is a nickel-based superalloy (e.g., similar to that of the associated disk or otherwise sufficiently matched in coefficient of thermal expansion (CTE)) optionally segmented for ease of assembly. Exemplary material for the abradable strip is a built-up material such as a plasma-sprayed nickel alloy (e.g., also sufficiently matching the CTE of the adjacent manifold material). Additional seal radial clearance may be desirable to accommodate any dynamic (e.g., vibratory) displacements tending to bring the teeth and rub strip into closer proximity. Advantageously, the rub strip still accommodates the possibility of contact with the teeth. Additionally, the gap span $L_1$ may be dimensioned to provide accommodation for anticipated thermal expansion and dynamic displacement changes. Given the additional clearance in the seals relative to the passageway surface offsets, further means may be provided for preventing the outflow of fuel/air charges along the charging sector. One such means is the venturi effect provided by the convergence of the surfaces 170 and 172 on the one hand and 184 and 186 on the other hand. The venturi effect reduces the local pressure within the flowpath, thereby reducing (if not eliminating) any pressure differential across the gap 182 between the manifold-tube flowpath and either of the sections 80 and 84. The effect may even be sufficient to cause leakage from the sections 80 and/or 84 into the manifold-tube flowpath. In an exemplary embodiment, cold/non-running $L_1$ may be 0.020–0.080 inch, more narrowly 0.030–0.060 inch. Exemplary $L_3$ and $L_4$ may be 0.020–0.100 inch, more narrowly, 0.040–0.070 inch. At cruise speed and temperature $L_3$ and $L_4$ may converge to zero. The nominal or average value of $L_1$ may well not change significantly, but may go through a dynamic excursion (e.g., +/−0.010–0.030 inch) due to cyclical impulse loading from the combustor tubes. The magnitude of the excursion will depend on the axial stiffness built into the tube pack spool and the bearings. That stiffness will determine the needed nominal $L_1$ in the cold/non-running condition.

Figure 13:
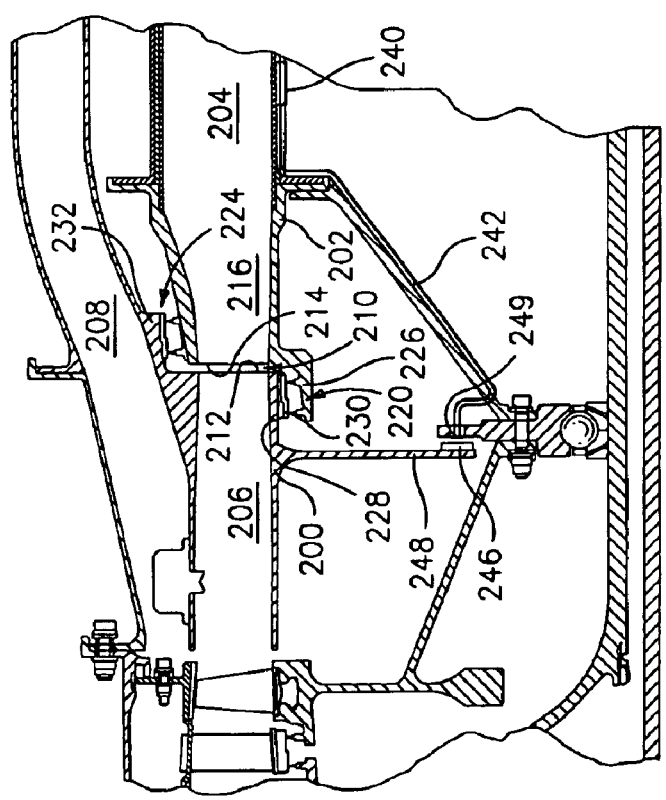
FIG. 13 is a longitudinal sectional view of an alternate manifold-disk junction.

FIG. 13 shows an alternate manifold 200 and disk 202. The disk 202 provides inlets to a circumferential array of combustion conduits 204. The exemplary manifold 200 has duct sections 206 and 208 respectively directing air to the combustion conduits and along a combustion bypass flowpath passing outboard of the conduit array. As with the embodiment of FIG. 10, there may be a gap 210 between a manifold outlet 212 and an inlet 214 to flow passageways 216 in the disk 202 forming the leading portion of the associated combustion conduit 204. This exemplary station cut face gap is sealed by inboard and outboard labyrinth seal systems 220 and 224. The inboard seal system 220 has teeth extending outward from a forward extending lip 226 of the disk 202 inboard of the mating portion 228 of the manifold which, in turn, carries an abradable seal material 230. The teeth of the outboard seal system 224 are formed on the disk 202 outboard of the passageway 216 and seal with abradable seal material 232 of the manifold outboard thereof. The duct 206 and passageway 216 may have cross-sections convergent toward the junction to provide the venturi effect. As with the embodiment of FIG. 10, a static cold radial misalignment may transition to a running hot alignment between the adjacent surfaces of the duct 206 and passageway 216. FIG. 13 further shows an exemplary igniter 240 connected by wiring 242 to a contact 244 rotating with the array and selectively cooperating with stationary contacts 246 on a flange 248 extending inward from the manifold.

Figure 14:
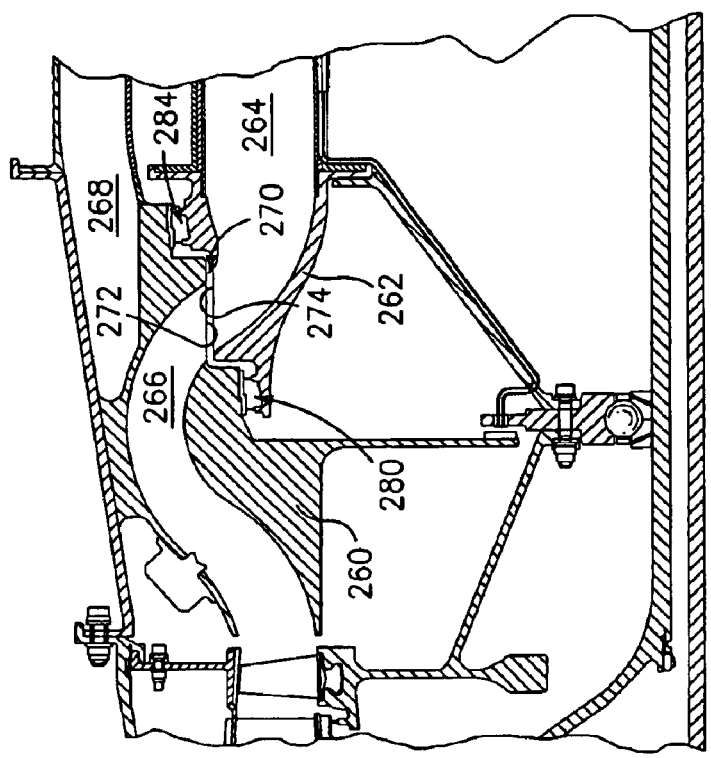
FIG. 14 is a longitudinal sectional view of a second alternate manifold-disk junction.

FIG. 14 shows yet another embodiment which may be generally similarly formed to the embodiment of FIG. 13 but wherein a junction along a flowpath between the manifold 260 and disk 262 is longitudinal. The manifold has ducts 266 and 268 respectively defining a flowpath to the conduit 264 and a combustion bypass flowpath. A longitudinally extending gap 270 is defined between a manifold outlet 272 and disk inlets 274. Labyrinth seal systems 280 and 284 may be provided on opposite sides of the combustion flowpath. Combustion flowpath constriction at the junction may provide the venturi effect. With such a longitudinal gap, heating and dynamics may have a relatively great effect on the size of the gap between manifold and disk. With such a gap, it may be particularly desirable to provide some form of active gap control. For example, the cold static condition may have a relatively large gap which closes to a minimum amount in a hot running condition. Certain transient conditions may otherwise enlarge the gap. For example, when hot, the engine may be throttled back to a lower speed, reducing the centrifugal effect and increasing the gap. In such a condition, controlled cooling of the manifold could thermally contract the manifold to reduce the gap and thereby reduce leakage. Alternatively, controlled supplemental heating of the disk could thermally expand the disk to reduce the gap. Cooling or heating may be by controlled venting of cooling or heating gas (e.g., bypass air or diverted exhaust gas, respectively).

If sealing the inlet ends of the conduit for discharge is impractical in view of cost and durability considerations, alternative embodiments involve providing the blocking portion with a u-shaped passageway, one leg of which communicates with the tube inlet and the other leg of which communicates with an auxiliary at least partially longitudinal exhaust conduit. Such exhaust conduit may be mounted to the carousel or fixed and external thereto. Upon ignition of the charge in the combustion conduit, the combustion products are expelled both from the combustion tube outlet and from the inlet. The latter flow of combustion products may flow through the exhaust conduit and, for example, join the remainder at an outlet of such exhaust conduit proximate the combustion tube outlet. This reduces the pressure loads on the seal between the manifold and carousel.

Many variations are possible. For example, the tubes may be other than parallel to the engine central axis. This, for example, includes skewing at substantially even radius from the engine axis or at a radius that varies with the longitudinal position. The tubes may be other than straight. Other variations may involve tubes with non-circular and non-constant cross-sections. Whereas the circular section provides certain structural and manufacturing advantages, other sections may well be used to provide desired flow properties.

One or more embodiments of the present invention have been described. Nevertheless, it will be understood that various modifications may be made without departing from the spirit and scope of the invention. For example, the details of any particular application will influence the configuration of the combustor. Various features of the combustor may be fully or partially integrated with features of the turbine or the compressor. If applied in a redesign of an existing turbine engine, details of the existing engine may implement details of the implementation. The rotating combustor may alternatively be used in applications beyond turbine engines. Accordingly, other embodiments are within the scope of the following claims.

What is claimed is:

1. A turbine engine comprising:
   a case having an axis;
   a compressor;
   a turbine; and
   a combustor comprising:
      a fuel source;
      a circumferential array of combustion chamber conduits, the conduits being downstream of the compressor and upstream of the turbine; and
      a manifold positioned to direct a mixture of air from the compressor and fuel from the fuel source to the array, the array supported for continuous rotation relative to the case in a first direction about the axis to cyclically bring each conduit from a charging zone for receiving a charge of said mixture from upstream to a discharging zone for downstream discharging of products of combustion of said charge, a flow path extending between a downstream portion of the manifold and an upstream portion of the array the flow path being locally bounded by first surface portions of the manifold and array and where the first surface portions have a first relative radial alignment when the array is rotating at a first speed and a second radial alignment, closer than the first radial alignment, when the array is rotating at a second speed, greater than the first speed.

2. The engine of claim 1 further comprising:
   at least one of a first seal inboard of the flow path and a second seal outboard of the flow path for sealing between the manifold and array.

3. The engine of claim 2 having both said first and second seals and wherein:
   said first and second seals are annular frustoconical labyrinth seals.

4. The engine of claim 1 wherein:
   said first and second seals each have teeth on the array and a mating rub strip on the manifold, the rub strip being abradable relative to a remaining portion of the manifold; and
   for each of the first and second seals, the teeth and rub strip are in closer proximity when the array is rotating at a second speed than at the first speed.

5. The engine of claim 1 wherein:
   the first surfaces of the manifold and array each include an inboard portion and an outboard portion at least over a streamwise span convergent toward a junction between the manifold and array.

6. A turbofan engine comprising:
   a fan;
   a compressor;
   a turbine coaxial with the compressor along an axis;
   a pulsed combustion combustor receiving air from the compressor and outputting combustion gasses to the turbine and having:
      a plurality of combustion chamber conduits held for rotation about the axis through a plurality of positions, including:
         at least one charge receiving position for receiving a charge from upstream;
         at least one initiation position for initiating combustion of the charge; and
         at least one discharge position for downstream discharging of products of combustion of said charge; and
      means for directing the charge to the conduits in the at least one charge receiving position and comprising:
         a first portion;
         a second portion, downstream of the first portion and positioned to rotate with the conduits during said rotation, at least one of the first and second portions including means for controlling leakage of the charge through one or more gaps between the first and second portions via a venturi effect.

7. The engine of claim 6 wherein:
   the means for controlling comprises inboard and outboard surfaces of both the means for directing and a leading annular element joining the combustion chamber conduits convergent toward a junction between the means for directing and the leading annular element.

8. A pulsed combustion device comprising:

a support structure;

a combustor carousel supported by the support structure and rotating relative thereto about an axis and comprising:
- a plurality of combustion conduits in a circumferential array, each cyclically receiving a charge and discharging combustion products of the charge; and a nonrotating manifold portion having:
- at least a first sector conveying air to an aligned transient first group of the combustion conduits; and
- at least a second sector blocking upstream ends of an aligned transient second group of the combustion conduits from upstream communication, first surface portions of the array and manifold providing a venturi effect at a junction between the array and manifold to limit leakage of the charge through the junction.

9. The device of claim 8 wherein combustion of the charge comprises detonation.

10. The device of claim 8 being a turbine engine comprising:
- a compressor upstream of the carousel; and
- a turbine downstream of the carousel.

* * * * *